(12) United States Patent
DeGiovine et al.

(10) Patent No.: US 6,612,493 B1
(45) Date of Patent: Sep. 2, 2003

(54) OPTICAL SCANNER INCLUDING A THERMOSTATICALLY CONTROLLED HEATER MODULE OR HERMATIC SEAL TO PREVENT INTERNAL CONDENSATION

(75) Inventors: Carlo DeGiovine, Shirley, NY (US); John G. Lert, Jr., Westport, CT (US); Timothy Kehoe, Smithtown, NY (US); Mark Krichever, Hauppauge, NY (US); Richard A. Migliaccio, Centereach, NY (US); David Tsi, Stony Brook, NY (US); Mark van Tilburg, Son; Peter Hoste, Gravenhage, both of (NL)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 09/321,183

(22) Filed: May 27, 1999

(51) Int. Cl.7 .................................................. G06K 7/10
(52) U.S. Cl. ............................ 235/462.01; 235/462.13; 235/472.01
(58) Field of Search ....................... 235/472.01–472.03, 235/454

(56) References Cited

U.S. PATENT DOCUMENTS

| | | | | |
|---|---|---|---|---|
| 4,532,544 A | * | 7/1985 | Federau ........................ 358/87 |
| 4,188,527 A | * | 12/1995 | Follmer ........................ 219/202 |
| 5,729,003 A | * | 12/1995 | Briggs, III .............. 235/472.01 |
| 5,508,505 A | | 4/1996 | Walts et al. ................. 235/472 |

* cited by examiner

Primary Examiner—Karl D. Frech

(57) ABSTRACT

Disclosed is a method and apparatus for preventing condensation from forming on the internal components of an optical scanner, allowing the scanner to be moved between hot and cold environments without sacrificing scanning performance or damaging the scanner. The optical scanner can be a laser scanner or a solid state imager. One method of preventing moisture from condensing on the inside of a scanner is to control the internal temperature of the scanner. This is accomplished by installing a thermostatically controlled heater module on the inside of the scanner and warming up the scanner's internal air when the air temperature falls below a predetermined point. Another method of preventing moisture from condensing on the inside of the scanner is to hermetically seal the scanning enclosure and fill with inert gas.

8 Claims, 5 Drawing Sheets

OPTICAL SCANNER INCLUDING A THERMOSTATICALLY CONTROLLED HEATER MODULE OR HERMATIC SEAL TO PREVENT INTERNAL CONDENSATION

FIELD OF THE INVENTION

This invention relates to the field of optical scanners. More specifically, the invention relates to an optical scanner, such as a bar code scanner, which can operate in extreme thermal conditions without performance degradation due to condensation and frost.

BACKGROUND OF THE INVENTION

Electro-optical scanners, such as bar code symbol scanners, are now quite common. Typically, a bar code symbol comprises one or more rows of light and dark regions, typically in the form of rectangles. The widths of the dark regions, i.e., the bars, and/or the widths of the light regions, i.e., the spaces between the bars, when partitioned into groups, indicate encoded information to be read.

A bar code symbol reader illuminates the symbol and senses light reflected from the coded regions to detect the widths and spacings of the coded regions and derive the encoded information. Bar code reading type data input systems improve the efficiency and accuracy of data input for a wide variety of applications. The ease of data input in such systems facilitates more frequent and detailed data input, for example to provide efficient inventories, tracking of work in progress, etc.

A variety of scanning systems are known. One particularly advantageous type of reader is an optical scanner which scans a beam of light, such as a laser beam, across the symbols. Laser scanner systems and components of the type exemplified by U.S. Pat. Nos. 4,387,297 and 4,760,248—which are owned by the assignee of the instant invention and are incorporated by reference herein—have generally been designed to read indicia having parts of different light reflectivity, i.e., bar code symbols, particularly of the Universal Product Code (UPC) type, at a certain working range or reading distance from a hand-held or stationary scanner.

FIG. 1 illustrates an example of a prior art bar code symbol reader 10 implemented as a gun shaped device, having a pistol-grip type of handle 53. A lightweight plastic housing 55 contains a light source 46, a detector 58, optics 57, signal processing circuitry 63, a programmed microprocessor 40, and a power source or battery 62. An exit window 56 at the front end of the housing 55 allows an outgoing light beam 51 to exit and an incoming reflected light 52 to enter. A user aims the reader at a bar code symbol 70 from a position in which the reader 10 is spaced from the symbol, i.e. not touching the symbol or moving across the symbol.

As further depicted in FIG. 1, the optics may include a suitable lens 57 (or multiple lens system) to focus the scanned beam into a scanning spot at an appropriate reference plane. The light source 46, such as a semiconductor laser diode, introduces a light beam into an optical axis of the lens 57, and other lenses or beam shaping structures as needed. The beam is reflected from an oscillating mirror 59 which is coupled to a scanning drive motor 60 energized when a trigger 54 is manually pulled. The oscillation of the mirror 59 causes the outgoing beam 51 to scan back and forth in a desired pattern.

A variety of mirror and motor configurations can be used to move the beam in a desired scanning pattern. For example, U.S. Pat. No. 4,251,798 discloses a rotating polygon having a planar mirror at each side, each mirror tracing a scan line across the symbol. U.S. Pat. Nos. 4,387,297 and 4,409,470 both employ a planar mirror which is repetitively and reciprocally driven in alternate circumferential directions about a drive shaft on which the mirror is mounted. U.S. Pat. No. 4,816,660 discloses a multi-mirror construction composed of a generally concave mirror portion and a generally planar mirror portion. The multi-mirror construction is repetitively reciprocally driven in alternative circumferential directions about a drive shaft on which the multi-mirror construction is mounted.

The light 52 reflected back by the symbol 70 passes back through the window 56 for transmission to the detector 58. In the exemplary reader shown in FIG. 1, the reflected light reflects off a mirror 59, passes through an optical filter 47 and impinges on the light sensitive detector 58. The filter is typically designed to have a band-pass characteristic in order to pass the reflected (return) laser light and block the light coming from other optical sources. The detector 58 produces an analog signal proportional to the intensity of the reflected light 52.

The signal processing circuitry includes a digitizer 63 mounted on a printed circuit board 61. The digitizer processes the analog signal from detector 58 to produce a pulse signal where the widths and spacings between the pulses correspond to the widths of the bars and the spacings between the bars. The digitizer serves as an edge detector or wave shaper circuit, and a threshold value set by the digitizer determines what points of the analog signal represent bar edges. The pulse signal from the digitizer 63 is applied to a decoder, typically incorporated in the programmed microprocessor 40 which will also have associated program memory and random access data memory. The microprocessor decoder 40 first determines the pulse widths and spacings of the signal from the digitizer. The decoder then analyses the widths and spacings to find and decode a legitimate bar code message. This includes analysis to recognize legitimate characters and sequences, as defined by the appropriate code standard. This may also include an initial recognition of the particular standard to which the scanned symbol conforms. This recognition of the standard is typically referred to as autodiscrimination.

To scan the symbol 70, the user aims the bar code reader 10 and operates movable trigger switch 54 to activate the light source 46, the scanning motor 60 and the signal processing circuitry. If the scanning light beam 51 is visible, the operator can see a scan pattern on the surface on which the symbol appears and adjust aiming of the reader 10 accordingly. If the light beam 51 produced by the source 46 is marginally visible, an aiming light may be included. The aiming light, if needed produces a visible-light spot which may be fixed, or scanned just like the laser beam 51. The user employs this visible light to aim the reader at the symbol before pulling the trigger.

The reader 10 may also function as a portable data collection terminal. If so, the reader would include a keyboard 48 and a display 49, such as described in the previously noted U.S. Pat. No. 4,409,470.

In electro-optical scanners (readers) of the type discussed above, the laser source, the optics, the mirror structure, the drive to oscillate the mirror structure, the photodetector, and the associated signal processing and decoding circuitry can all be packaged in a "scanning module", which in turn is placed into the scanner's, or terminal's housing.

Another type of an optical scanner is a solid state imaging (SSI) reader. The SSI reader will typically contain a solid state detector, such as a charge coupled device (CCD) or a metal-oxide semiconductor field effect transistor (MOSFET). Imaging scanners do not use a moving spot to illuminate an indicia being read, but instead flood illuminate the target, or use flood illumination from external sources, and detect the reflected light from at least a portion of the illuminated target.

Both, the scanning-type readers and the SSI-type readers have found wide acceptance in the retail, wholesale and industrial applications, such as point-of-sale, warehouse and manufacturing operations. Bar code readers are typically specified to operate in non-condensing environments. Certain applications require the reader to operate over a wide temperature range, for example from −30 to 50 degrees Celsius. In certain situations, such as when an operator must use the scanner inside and outside of a freezer, moving the scanner back and forth between hot to cold locations creates condensing environment around and inside the scanner. Condensation can form on both, exterior and interior surfaces of the scanner. The reader's exit window is particularly susceptible to condensation and frost. External condensation on the exit window can disable scanning by altering the outgoing scan beam. Internal condensation on the optical elements can do the same, and the condensation on the electronic components can cause short circuits and catastrophic failure of the device. Thus, the result of operating a scanner in a condensing environment can vary from a non-read or a miss-read of a scanned item, to a damaged device.

The need exists for a scanning system which can be operated in a condensing environment.

The need also exists for a scanning system which can be operated in cold and hot environments without degradation in performance due to frost and condensation.

The need also exits for an indicia reader which is not susceptible to condensation and frost, and allows for an uninterrupted operation during movements between the hot and cold environments.

The need also exists for a bar code reader which is not susceptible to condensation and frost, and allows an uninterrupted operation during movements between the hot and cold environments.

The need also exists for a laser-type bar code reader which is not susceptible to condensation and frost, and allows an uninterrupted operation during movements between the hot and cold environments.

The need also exists for a SSI type reader which is not susceptible to condensation and frost, and allows an uninterrupted operation during movements between the hot and cold environments.

SUMMARY OF THE INVENTION

The present invention is directed to an optical scanner which is not susceptible to condensation and frost and can be moved from hot and cold environments without any down time.

In one preferred embodiment, the applicants invented a heater module which is used to keep the scanner's internal ambient temperature within a set range. As the scanner is moved from hot to cold environments and the scanner's internal ambient temperature starts to fall, the heating element inside the heater module gets turned on. A re-circulating fan, also located inside the heater module, forces the air inside the scanner to flow over the heating element. The heated air is blown over the scanner's internal components, warming them up and preventing condensation. As the temperature of the scanner's exit window is raised, the likelihood of frost forming on the exterior is also reduced.

In another embodiment, the scanning components are placed in a hermetically sealed enclosure filled with inert gas. The absence of moisture in the enclosure eliminates the problem of condensation on the internal components.

DETAILED DESCRIPTION OF THE INVENTION

Although the following description discloses the use of the invention in bar code scanners, the invention is applicable to any type of optical scanners (readers) and the term "indicia" encompasses any type of machine readable medium.

Figure 1:
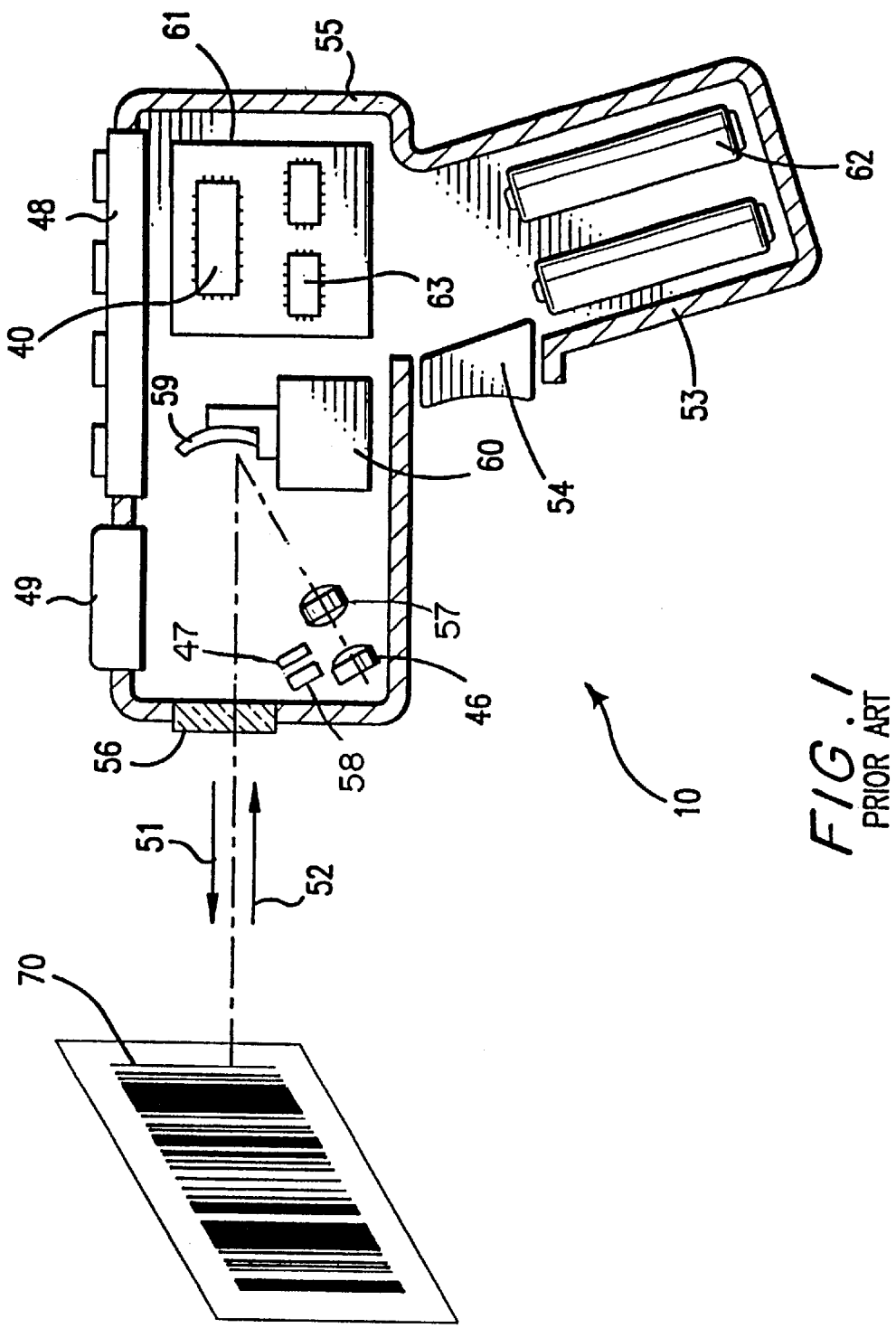
FIG. 1 illustrates a prior art bar code reader.
Figure 2:
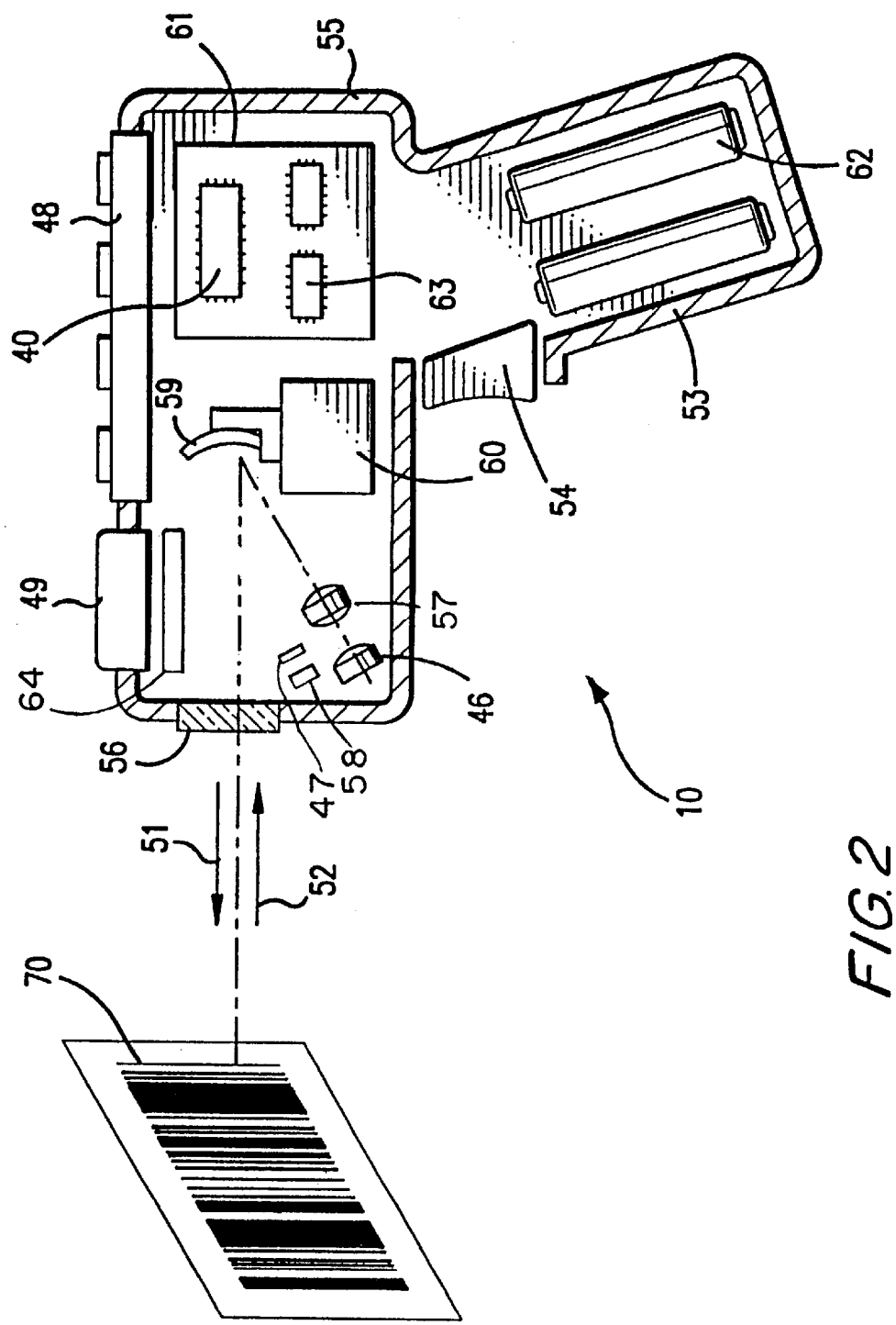
FIG. 2 illustrates a bar code reader of the present invention.

In order to overcome the problem of condensation and frost on the scanner's components, the applicants invented a heater module which is located on the inside of the scanner's housing. FIG. 2 illustrates a bar code reader of the present invention. As can be seen from FIG. 2, the heater module 64 is located in the upper part of the housing, preferably near the exit window. The reason the heater module has been placed close to the exit window 56 is because the exit window typically has the lowest thermal isolation factor and is one of the first components that is likely to have condensation deposited on its internal surface when the scanner is transported between the extreme temperature environments. Also, because condensation on the interior surface of the exit window impacts scanner performance more quickly and adversely then elsewhere. The module is designed to keep the ambient temperature inside the scanner's housing at such a point that would prevent condensation from forming on the scanner's internal components. As long as the heater module can keep the internal temperature high enough to prevent condensation, the module can be located any place within the housing. It should be noted that the module must not obstruct the optical paths of the outgoing optical beams and the incoming light reflected off the indicia.

Figure 3:
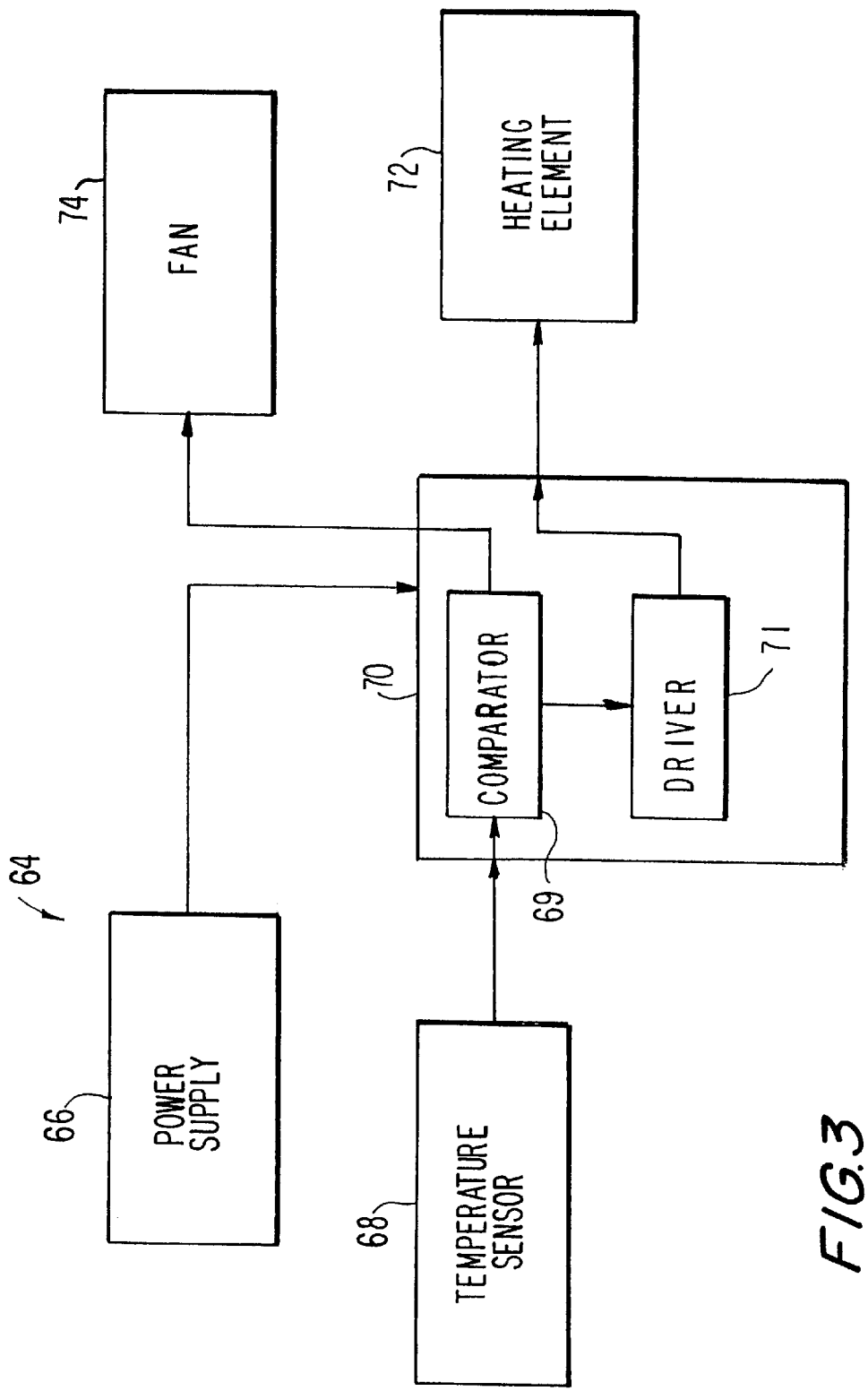
FIG. 3 illustrates a block diagram of the heating module of the preferred embodiment of the invention.

FIG. 3 is a block diagram of the heater module 64 of the present invention. The module 64 includes a power supply 66, a temperature sensor 68, a control circuit 70, a heating element 72 and a fan 74. The power supply provides regulated voltage to the individual components of the heater module 64. The temperature sensor 68 can be a thermal zener diode which produces a voltage that is proportional to the sensed temperature inside the scanner. The sensor outputs the produced voltage to the control circuit 70. The control circuit 70 includes a comparator 69 which compares the received zener voltage to a known reference voltage. If the sensed temperature is below the required level, the comparator 69 signals a heater driver 71 to turn on the heating element 72. The heating element 72 and the fan 74 are turned on and the heater module 64 starts blowing heated air inside the interior of the reader. When the sensed temperature reaches required level, the heating element 72 and the fan 74 are turned off to avoid overheating. The heating element 72 is typically a high power dissipation resistor which is either a discrete component or a resistive strip laid out on a printed circuit board. The heating element can also contain a fuse that limits the maximum amount of current which is allowed to pass through the resistor. In a KS3000 scanner manufactured by Symbol Technologies, Inc., the assignee of the present invention, the resistor dissipates 16 watts of power using 1.25 amperes of current. The power supply accepts a wide range of voltages and generates regulated voltage outputs, 5 volts for the fan and 12 volts for the heating element.

The power supply can be designed to source more than 3 amperes, allowing for a single 5 volts voltage level to be used for driving the fan and the heating element. The control circuit 70 can also be designed to vary the fan speed and/or the power dissipated by the heating element.

The system described above provides a stable ambient temperature inside the scanner. In certain embodiments it may be preferable to locate the power supply and the control circuit outside the scanner. This may be done in order to reduce the volume occupied by the heating module inside the scanner. In such a case, the power supply and the control circuit would be located outside the scanner, while the temperature sensor, the heating element and the fan would be located inside the scanner.

Figure 4:
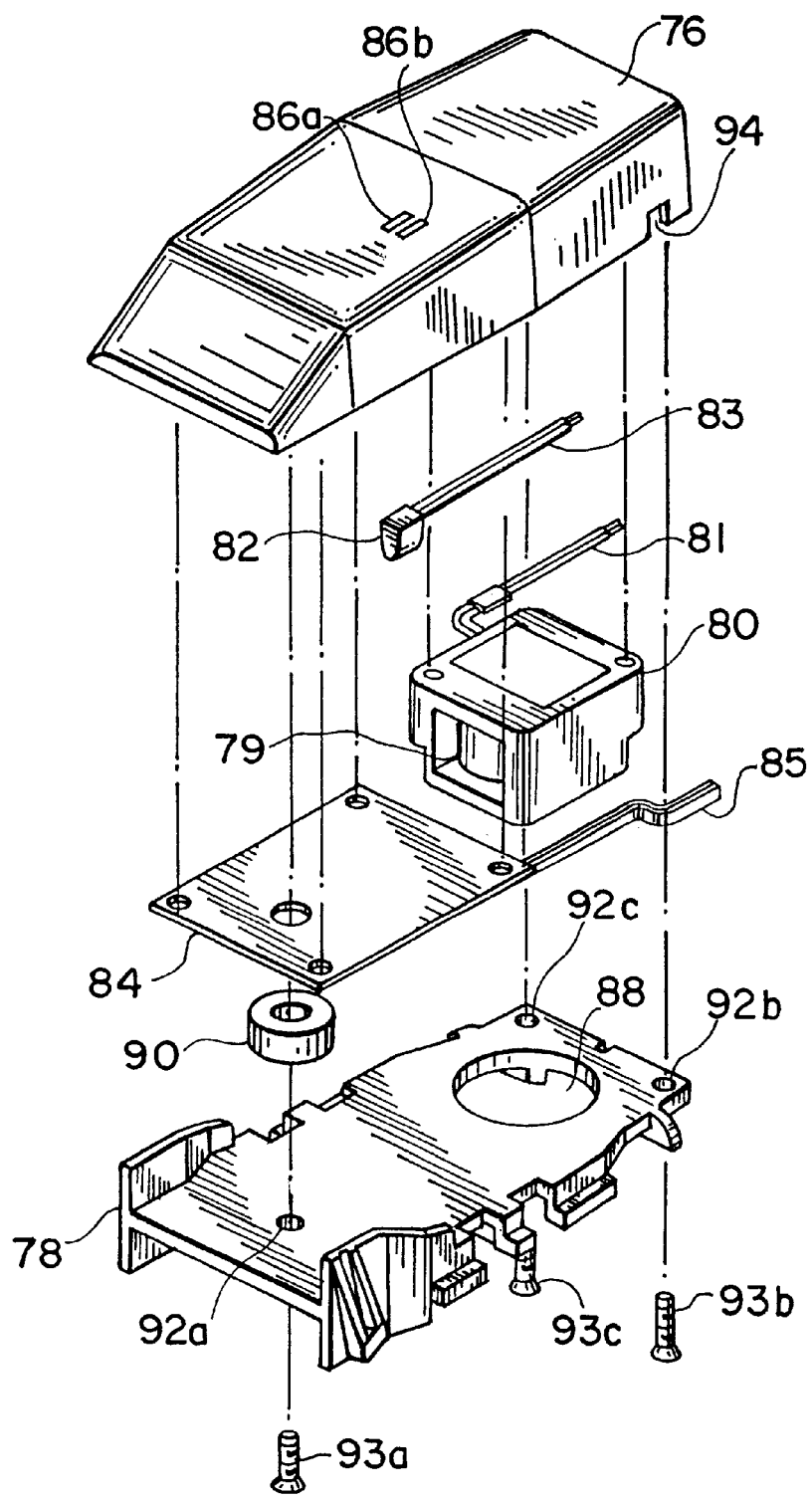
FIG. 4 illustrates an assembly of the heater module of the present invention, absent the power supply and the control circuit.

FIG. 4 illustrates a heater module assembly of the present invention, having the power supply and the control circuit located outside the assembly. The heater module assembly includes a top cover 76 and a bottom cover 78. A temperature sensor 82 is located underneath the interior surface of the top cover 76. The sensor 82 senses the scanner's interior temperature through a pair of air holes 86a and 86b in the top cover 76. The fan 80 and the heating element 84 are positioned between the top and bottom covers. The heating element 84 of the illustrated embodiment is a resistive strip deposited on a top surface of a circuit board. A spacer 90 separates the heating element from the top surface of the bottom cover 78. The fan 80 is positioned over a circular hole 88 in the bottom cover. During operation the fan 80 sucks the air through the circular hole 88 and redirects the air through an opening 79 in its housing. The redirected air warms up as it blows over the heating element 84. The heated air is forced into the scanner's interior through an opening between the front edges of the two covers. The covers are held together by three screw 93a, 93b and 93c, which are inserted into their respective holes 92a, 92b and 92c in the bottom cover 78 and are threaded into the top cover 76. The sensor wires 83, the fan wires 80 and the heating element wires 85 are all fed outside the assembly through a cutout 94 in the top cover 76. The wires electrically interconnect the temperature sensor 82, the fan 80 and the heating element 84 to the power supply and the control circuit located outside the scanner.

The present invention is not meant to be limited in the way the elements of the heating module are packaged together or in the specific way the air is being circulated inside the heating module and the scanner. The idea is to be able to control the scanner's internal temperature by warming up the air inside the scanner. In certain applications where there exists strong airflow, the fan 80 may be eliminated.

In an alternate embodiment, all of the elements of FIG. 3 are located in the heater module assembly.

In order to reduce the power load of the heating module and to reduce heat transfer through the scanner housing, the system may include a thermal cover which can either be placed onto the scanner's exterior or lined along the scanner's interior surfaces.

In situations where the only existing problem is condensation on the exit window, a heating element can be deposited on the interior surface of the window in a form of a conductive strip. The heating element must be positioned on the window in such a way as to avoid interference with the outgoing and the return light passing through the exit window.

In another alternate embodiment, the heating element can take the form of an optically transparent conductive film. The film's optical characteristics must be such that the film would not interfere with the outgoing and the return light passing through it.

While the present invention is applicable to any type of scanning applications, it is most easily implemented in warehousing operations, where goods stored in freezers, or refrigerators, are being transported in and out of the freezers on forklifts. Compared with a present day batteries used in portable scanners, a typical forklift battery is capable of supplying much larger amounts of current. The forklift battery is used to feed the regulating power supply of the heater module of the present invention. Compared with other loads connected to the forklift battery, the scanner's load is relatively small. Thus, the scanner of the present invention does not introduce a significant power burden on the forklift battery and at the same time provides an operator with a non-condensing scanning apparatus allowing for an uninterrupted operation during transitions from the extreme thermal environments.

Another way to prevent condensation from forming on the inside of a scanner is to fill the scanner with inert gas and to hermetically seal the scanner. While it may be somewhat difficult, although not impossible, to provide an air-tight enclosure for a scanner housing having the gun-shape form of the type shown in FIG. 2, the invention is easily implemented with respect to scanning modules. A scanning module is a miniaturized self contained scanning engine, including all the optical and electronic components needed for scanning an item, which is designed to be installed into a scanner housing as a module. The scanning module can be placed in a small hermetically sealed enclosure. The embodiment is illustrated in FIG. 5.

Figure 5:
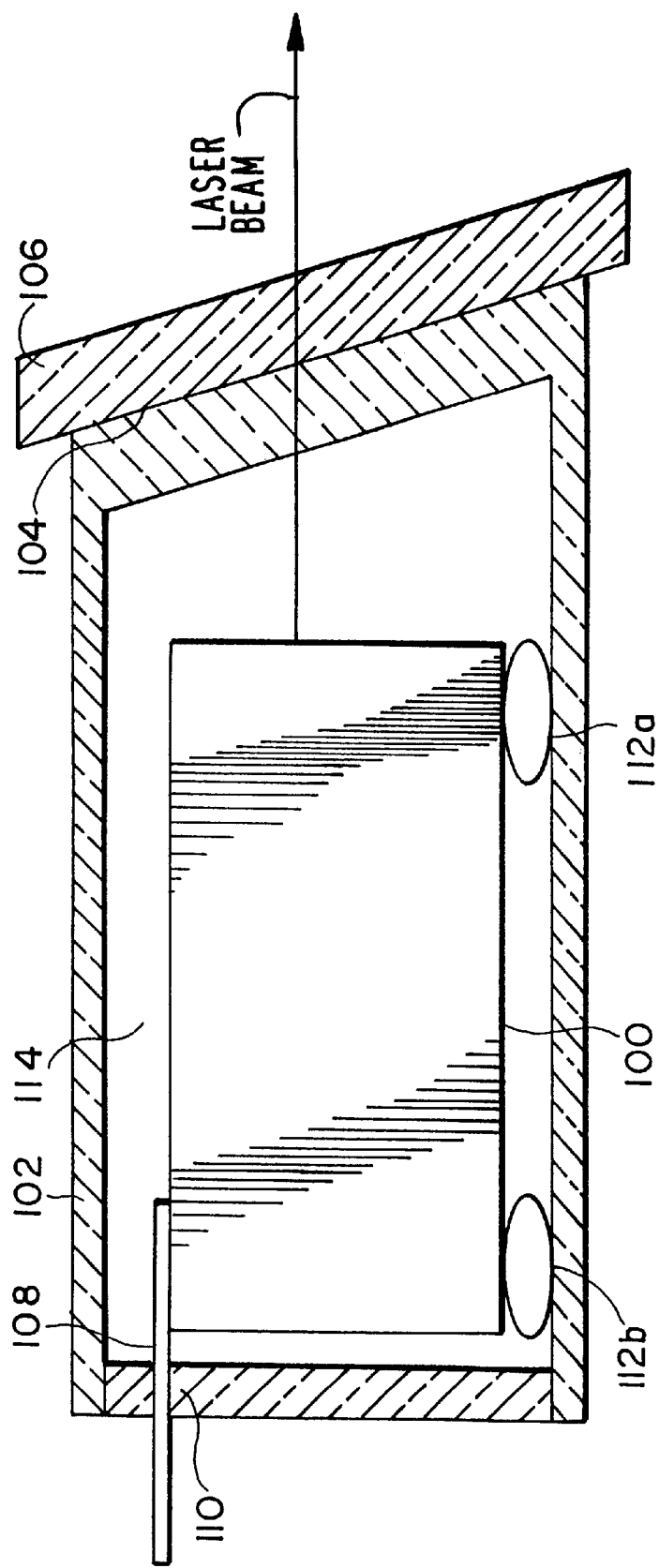
FIG. 5 illustrates an alternate embodiment of the invention.

As shown in FIG. 5, a scanning module 100 is positioned in an enclosure 102. The enclosure 102 has an opening 104 at which an optically transmissive enclosure window 106 is located. The scanner module includes an electrical cable 108 for interfacing to other parts of the scanning system. The cable 108 passes through an opening 110 in the rear of the enclosure 102. The design may provide for a number shock mounts 112a and 112b to be installed in the enclosure in order to prevent mechanical failure the scanning module due to shock and vibration. Once the scanning module 100 is installed in the enclosure 102, the enclosure gets filled with an inert gas and is hermetically sealed. Alternately, a silica gel cartridge may be incorporated into the enclosure to remove any internal moisture.

After the scanning module has been placed and sealed inside the enclosure 102, the enclosure is placed inside a scanner housing. In order to prevent condensation on the inside surface of the scanner's exit window, the exterior surface of the enclosure's window 106 is affixed to the interior surface of the scanner's exit window, thus removing moisture's access to the inside of the scanner's exit window. The two windows can be joined together by an optical grade epoxy or adhesive.

In some applications where a scanner is operated in high ambient temperatures it may be advantageous to design a cooling module, instead of a heating module, to be installed into the scanner. The cooling module can help keep the temperature of the internal scanner components within their respective operating temperature range.

Without further analysis, the foregoing will so fully reveal the gist of the present invention that others can, by applying current knowledge, readily adapt it for various applications without omitting features that, from the standpoint of the prior art, fairly constitute essential characteristics of the generic or specific aspects of this invention and, therefore, such adaptations should and are intended to be comprehended within the meaning and scope of the following claims.

We claim:

1. An optical scanning system comprising:
   a scanner housing having an opening;
   an optical window located at said opening, said window having an interior surface; and
   a heater system for controlling a temperature inside said scanner housing, said heater system including:
   a heater housing located inside said scanner housing;
   a sensor located inside said heater housing for sensing the temperature inside said scanner housing;
   a fan located inside said heater housing for providing an airflow inside said optical scanner;
   a heating element located inside said heater housing for heating the flowing air provided by said fan;
   a control circuit located inside said heater housing for receiving an output of said sensor and for controlling operation of said fan and said heating element; and
   a power supply located inside said heater housing for providing electrical power to said control circuit;
   whereby the temperature inside said scanner housing keeps moisture from condensing on said interior surface of said optical window.

2. An optical scanning system comprising:
   a scanner housing having an opening;
   an optical window located at said opening, said window having an interior surface; and
   a heater system for controlling a temperature inside said scanner housing, said heater system including:
   a heater housing located inside said scanner housing and having;
   a sensor located inside said heater housing for sensing the temperature inside said scanner housing;
   a fan located inside said heater housing for providing an air flow inside said optical scanner; and
   a heating element located inside said heater housing for heating the flowing air provided by said fan;
   said heater housing comprises: i) a top cover having a hole therethrough for allowing said sensor located underneath said top cover to sense the temperature inside said scanner housing; and ii) a bottom cover having a hole therethrough for allowing air inside said scanner housing to be sucked into said heater housing by said fan, said bottom cover mating with said top cover to form a heater housing opening in the front of said heater housing;
   whereby the flowing air heated by said heating element is forced out from the inside of said heater housing through said heater housing opening, and whereby the temperature inside said scanner housing keeps moisture from condensing on said interior surface of said optical window.

3. The optical scanning system of claim 2, wherein said heated air is forced out of said heater housing opening in the direction of said optical window.

4. An optical scanning system comprising:
   a scanner housing having an opening;
   an optical window located at said opening, said window having an interior surface; and
   a heater system for controlling a temperature inside said scanner housing, said heater system including:
   i) a sensor located inside said scanner housing for sensing the temperature inside said scanner housing;
   ii) a fan located inside said scanner housing for providing an air flow inside said optical scanner; and
   iii) a heating element located inside a scanner housing for heating the flowing air provided by said fan, said heating element including a fuse for limiting the maximum amount of current passing through said heating element;
   whereby the temperature inside said scanner housing keeps moisture from condensing on said interior surface of said optical window.

5. An optical scanning system comprising:
   a scanner housing having an opening;
   an optical window located at said opening, said window having an interior surface; and
   a heater system for controlling a temperature inside said scanner housing, said heater system including:
   i) a sensor located inside said scanner housing for sensing the temperature inside said scanner housing;
   ii) a fan located inside said scanner housing for providing an air flow inside said optical scanner; and
   iii) a heating element located inside a scanner housing for heating the flowing air provided by said fan, said heating element comprises a resistive strip laid out on a printed circuit board;
   whereby the temperature inside said scanner housing keeps moisture from condensing on said interior surface of said optical window.

6. A non-condensing optical scanner comprising:
   a scanning module;
   an enclosure window for transmitting optical energy to said scanning module;
   a hermetically sealed enclosure attached to said enclosure window, said enclosure containing said scanning module inside it and filled with inert gas;
   an electrical interface for interfacing said scanning module to electronic components located outside said hermetically sealed enclosure;
   a scanner housing containing said hermetically sealed enclosure; and
   a scanner window secured to said scanner housing and having an interior surface of said scanner window affixed to an exterior surface of said enclosure window.

7. The non-condensing optical scanner of claim 6, wherein said scanner window and said enclosure window are affixed together by an optically transmissive adhesive.

8. The non-condensing optical scanner of claim 6, further comprising a shock absorber positioned between said scanner housing and said hermetically sealed enclosure, said shock absorber providing mechanical shock isolation for said scanning module.

* * * * *